United States Patent
Kawato (10) Patent No.: US 8,346,933 B2
(45) Date of Patent: Jan. 1, 2013

(54) VIRTUAL MACHINE LOCATION SYSTEM, VIRTUAL MACHINE LOCATION METHOD, PROGRAM, VIRTUAL MACHINE MANAGER, AND SERVER

(75) Inventor: Masahiro Kawato, Minato-ku (JP)

(73) Assignee: NEC Corporation, Tokyo (JP)

( * ) Notice: Subject to any disclaimer, the term of this patent is extended or adjusted under 35 U.S.C. 154(b) by 602 days.

(21) Appl. No.: 12/514,389

(22) PCT Filed: Nov. 22, 2007

(86) PCT No.: PCT/JP2007/072640
§ 371 (c)(1),
(2), (4) Date: May 11, 2009

(87) PCT Pub. No.: WO2008/062864
PCT Pub. Date: May 29, 2008

(65) Prior Publication Data
US 2010/0005465 A1    Jan. 7, 2010

(30) Foreign Application Priority Data
Nov. 24, 2006   (JP) .................................. 2006-317175

(51) Int. Cl.
*G06F 15/173* (2006.01)
(52) U.S. Cl. ............. 709/226; 709/222; 718/1; 713/320
(58) Field of Classification Search ................... 709/226
See application file for complete search history.

(56) References Cited

U.S. PATENT DOCUMENTS

| | | |
|---|---|---|
| 2003/0097393 A1 | 5/2003 | Kawamoto et al. |
| 2005/0251802 A1* | 11/2005 | Bozek et al. ....................... 718/1 |
| 2006/0069761 A1* | 3/2006 | Singh et al. ................... 709/222 |
| 2006/0195751 A1 | 8/2006 | Hess et al. |
| 2008/0127182 A1* | 5/2008 | Newport et al. .................. 718/1 |
| 2008/0196043 A1* | 8/2008 | Feinleib et al. ............... 719/319 |
| 2009/0204826 A1* | 8/2009 | Cox et al. ...................... 713/320 |

FOREIGN PATENT DOCUMENTS

| | | |
|---|---|---|
| JP | 10-283210 A | 10/1998 |
| JP | 2003-157177 A | 5/2003 |
| JP | 2005-031892 A | 2/2005 |
| JP | 2005-115653 A | 4/2005 |
| JP | 2006-244481 A | 9/2006 |

OTHER PUBLICATIONS

Office Action dated Aug. 3, 2012, issued by the Japanese Patent Office in counterpart Application No. 2008-545447.

* cited by examiner

*Primary Examiner* — Hua Fan
(74) *Attorney, Agent, or Firm* — Sughrue Mion, PLLC (57) ABSTRACT

A virtual machine location system includes a resource conflict detection unit for detecting a resource conflict using measurement data regarding a resource usage state of the entirety of a single server and a resource usage state of virtual machines running on the server, and a virtual machine relocation determination unit for transferring the virtual machine on the server for which a resource conflict has been detected to another server having a lower resource usage rate are included.

18 Claims, 9 Drawing Sheets

FIG. 3

311 RESOURCE USAGE STATE DATA

| SERVER NAME | CPU USAGE STATE (TOTAL) | CPU USAGE STATE (VM1) | CPU USAGE STATE (VM2) | CPU USAGE STATE (VM3) | CPU USAGE STATE (VM4) |
|---|---|---|---|---|---|
| host01 | 24% | 8% | 15% | – | – |
| host02 | 6% | 2% | 3% | – | – |
| host03 | 82% | 42% | 36% | 2% | – |
| host04 | 85% | 80% | 2% | 1% | – |
| host05 | 84% | 29% | 27% | 25% | 1% |

VIRTUAL MACHINE LOCATION SYSTEM, VIRTUAL MACHINE LOCATION METHOD, PROGRAM, VIRTUAL MACHINE MANAGER, AND SERVER

TECHNICAL FIELD

The present invention relates to a virtual machine location system and a virtual machine location method, and in particular, to a virtual machine location system, a virtual machine location method, a virtual machine manager, a program and a server for changing the location of a virtual machine based on a resource conflict situation during operation.

BACKGROUND ART

A virtual machine (VM) technique, which causes a plurality of operating systems (OS) to run on a single server (a computer such as a workstation, a personal computer, and a server-only machine) so that one computer may be virtually used as a plurality of servers, has been known. As products using this type of technique, "VMWare (Registered Trademark) ESX Server" from VMWare Inc, "Virtual Server" from Microsoft (Registered Trademark) Corporation, and "Xen" from XenSource Inc. (US) have been known. By issuing a command to create a virtual machine, these products can create new virtual machines on a server.

In addition, a technique of transferring a virtual machine created on a server to another server in a distributed processor environment where a plurality of servers are connected through a network has been known. The technique of transferring a virtual machine has been described in Japanese Patent Application Laid-Open Patent Publication No. Hei 10-283210 (Patent Document 1), for example. Such a technique provides a function for transferring a virtual machine referred to as vMotion for VMware (Registered Trademark), and as migration for Xen.

In such an environment where a plurality of servers are distributed, since each virtual machine has a different performance requirement, which virtual machine is located on which server (hereinafter referred to as location of virtual machine) affects the effective performance of the virtual machine.

As a method of determining the location of a virtual machine, a method has been known in which, based on measurement data indicating the performance of existing virtual machines, the sum of the performance values is calculated for each of the possible combinations of respective virtual machines and respective servers, and each virtual machine is relocated in order to maximize the sum, which has been described in Japanese Patent Application Laid-Open Patent Publication No. 2005-115653 (Patent Document 2).

Patent Document 1 Japanese Patent Application Laid-Open Patent Publication No. Hei 10-283210
Patent Document 2 Japanese Patent Application Laid-Open Patent Publication No. 2005-115653

As described above, the techniques described in the patent documents determine the location of a virtual machine based on past performance data concerning a virtual machine to be located.

A first problem of the method is that the quick relocation of a virtual machine in response to a change in load on the virtual machine cannot be achieved.

The reason is that a sudden increase in load cannot be detected because the performance data has to be collected over a fixed period of time (typically, several minutes to several hours).

A second problem is that a situation occurs in which a system constructed on a virtual machine cannot be temporarily used.

The reason is that the system is temporarily stopped in the course of relocation because all the existing virtual machines become targets of the relocation.

EXEMPLARY OBJECT OF THE PRESENT INVENTION

An exemplary object of the present invention is to provide a virtual machine location system capable of maintaining the location of an optimal virtual machine by relocating the virtual machine immediately when performance degradation occurred because of a sudden increase in load.

Another exemplary object of the present invention is to provide a virtual machine location system capable of relocating a virtual machine with a system on the virtual machine being run, by imposing a limitation on virtual machines, which become targets of the relocation.

SUMMARY

According to an exemplary aspect of the invention, a virtual machine location system, includes a resource conflict detection unit for detecting a resource conflict using measurement data regarding a resource usage state of the entirety of a single server, and a resource usage state of a virtual machine running on said server, and a virtual machine relocation determination unit for transferring said virtual machine on said server for which said resource conflict has been detected to another server having a lower resource usage rate.

According to the present invention, the following effects can be achieved.

A first effect is that a virtual machine can be relocated immediately in response to a sudden change in load.

A second effect is that a virtual machine can be relocated without stopping a system running on the virtual machine.

EXEMPLARY EMBODIMENT

First Exemplary Embodiment

A virtual machine location system according to a first exemplary embodiment of the present invention will now be described in detail with reference to the drawings.

Structure of the First Exemplary Embodiment

Figure 1:
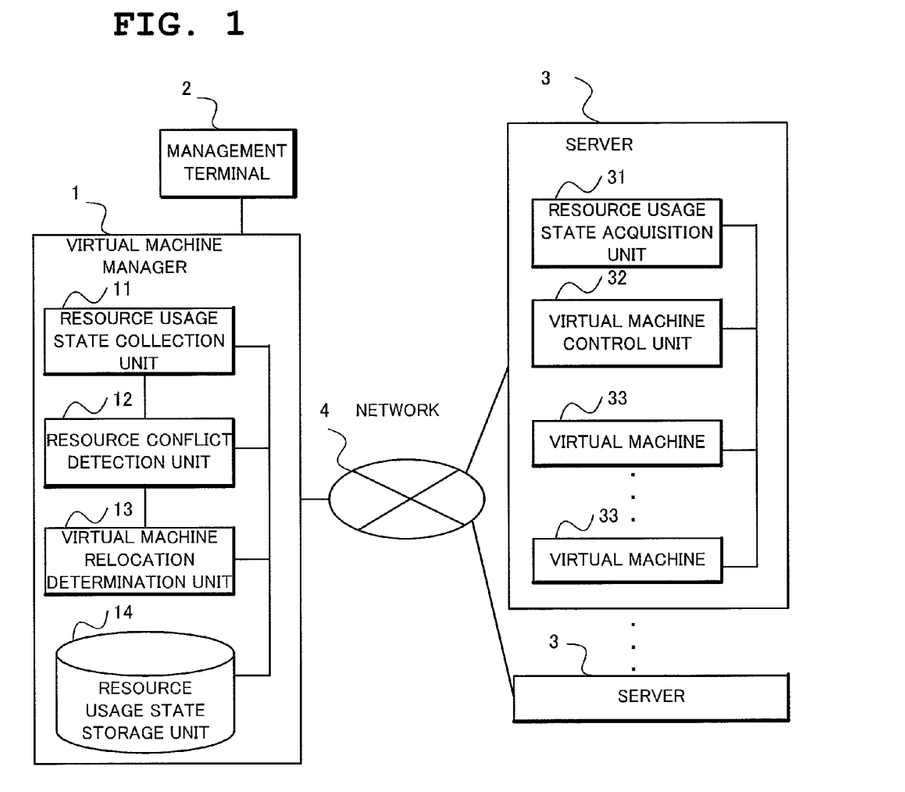
FIG. 1 is a block diagram illustrating the structure of a virtual machine location system according to a first exemplary embodiment of the present invention.

FIG. 1 is a block diagram illustrating the structure of a virtual machine location system according to the present exemplary embodiment.

Referring to FIG. 1, the virtual machine location system according to the present exemplary embodiment comprises a virtual machine manager 1, a management terminal 2 and a plurality of servers 3.

The virtual machine manager 1 is a computer controlled by a program, and includes a resource usage state collection unit 11, a resource conflict detection unit 12, a virtual machine (VM) relocation determination unit 13 and a resource usage state storage unit 14.

The management terminal 2 is connected to the virtual machine manager 1, and is a terminal device (console) operated by a system administrator. The management terminal 2 usually comprises a display unit (display, monitor), a key board and a mouse. Referring to FIG. 1, the management terminal 2 is connected directly to the virtual machine manager 1, but may be connected through a network 4.

The server 3 is a computer having the ability to activate one or more virtual machines, and includes a resource usage state collection unit 31, a virtual machine control unit 32 and a plurality of virtual machines 33.

The virtual machine manager 1 and the servers 3 (and in some cases, the management terminal 2) are interconnected through the network 4. The network 4 may be a local area network (LAN) such as Ethernet (Registered Trademark), a wide area network (WAN) such as the internet, or may be a combination of them.

Each of the units has generally the following functions:

The resource usage state collection unit 11 has a function for acquiring resource usage state data 311 (not shown) indicating the latest resource usage state from a plurality of resource usage state acquisition units 31 through the network 4, and a function for storing the acquired resource usage state data 311 in the resource usage state storage unit 14.

A typical example of the resource usage state data 311 is data including a CPU (processor, central processing unit) usage rate regarding the entire server 3, a CPU usage rate used by each of the virtual machines 33 running on the server 3, memory (main memory) usage, and an input/output (I/O) bandwidth.

The resource conflict detection unit 12 has a function for determining whether or not there is a resource conflict condition, based on the resource usage state data 311 collected from the resource usage state acquisition unit 31 by the resource usage state collection unit 11.

A resource conflict condition means that two or more virtual machines 33 running on a single server 3 are in a highly loaded states with respect to the same type of resource. As a specific example of a decision criterion of the resource conflict condition, a condition in which the CPU usage rate regarding the entirety of the single server 3 has reached a predetermined threshold (e.g., 80%), and the CPU usage rates of at least two of the virtual machines 33 running on the single server 3 have reached another predetermined threshold (e.g., 10%), is determined to be a resource conflict condition.

The virtual machine relocation determination unit 13 has a function for determining a transfer destination server 3 for the virtual machine 33 running on the server 3, which was determined to be in the resource conflict condition by the resource conflict detection unit 12, and controlling the transfer of the virtual machine 33 according to the determination. In this case, an example of a method of determining the transfer destination server 3 includes selecting a server having the lowest CPU usage rate regarding the entire server 3.

The resource usage state storage unit 14 has a function for storing the resource usage state data 311.

The resource usage state acquisition unit 31 has a function for regularly acquiring the resource usage state data 311 regarding the server 3 and the virtual machines 33 running on the server 3 including a CPU usage rate, memory (main memory) usage and an input/output (I/O) bandwidth, and sending the result to the resource information collection unit 11.

The virtual machine control unit 32 has a function for controlling the transfer of the existing virtual machine 33 according to the command from the virtual machine relocation determination unit 13. This function typically performs processing such as storage of the running state of the virtual machine 33 and halting of the virtual machine 33 on the transfer source server 3, and restoration of the running state of the virtual machine 33 and activation of the virtual machine 33 on the transfer destination server 3.

The above described resource usage state acquisition unit 31 and the virtual machine control unit 32 use functions provided by the above described virtual machine products (e.g., VMware (Registered Trademark), Microsoft (Registered Trademark) Virtual Server and Xen).

The CPU usage rate regarding the entire server 3 and the CPU usage rate of the virtual machine 33 will now be described in detail.

First, the resource usage state data 311 stored in the resource usage state storage unit 14 will be described. Items contained in the resource usage state data 311 include (1) the CPU usage rate regarding the entirety of the single server 3 (hereinafter referred to as the total CPU usage rate), and (2) the CPU usage rate of each virtual machine 33 running on the server 3, for example.

Next, the concept of the total CPU usage rate and the CPU usage rate of the virtual machine 33 will be described.

The total CPU usage rate means the CPU usage rate for a fixed period of time until data acquisition time (e.g., one minute) when the resource usage state acquisition unit 31 has acquired the resource usage state data 311, among the CPU usage rates of the CPUs mounted on a single server 3. The maximum value is 100%. When more than one CPU or CPU core is mounted on the single server 3, the total CPU usage rate is calculated by averaging the usage rates regarding the CPUs or CPU cores and performing normalization so that the maximum value may be 100%.

Figure 2:
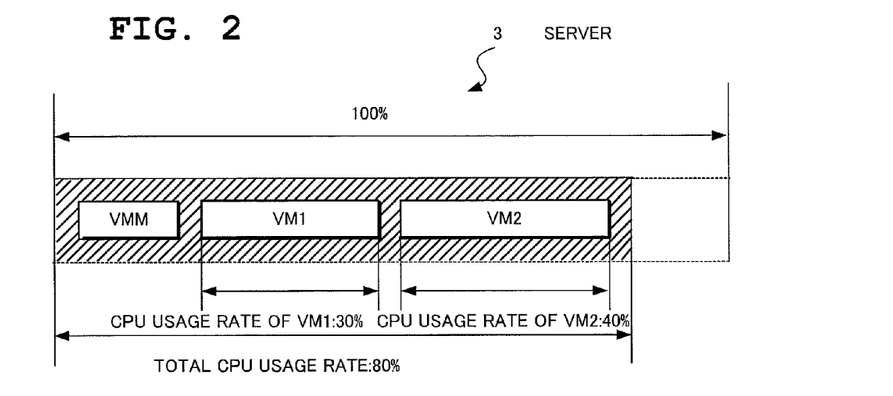
FIG. 2 is a diagram illustrating a concept of a CPU usage rate of a virtual machine according to the first exemplary embodiment.

FIG. 2 is a diagram illustrating the concept of the CPU usage rate of the virtual machine according to the present exemplary embodiment.

Each of a virtual machine monitor (VMM) and a plurality of virtual machines 33 running on a single server 3 uses part of the total CPU usage rate. In the example of FIG. 2, a virtual machine monitor and two virtual machines 33 (VM1 and VM2) are running on the server 3, and VM1 and VM2 use CPU time of 30% and 40%, respectively. Namely, the CPU usage rates of the VM1 and VM2 are 30% and 40%, respectively.

Generally, the value of the total CPU usage rate of a single server 3 is slightly smaller than the sum of the CPU usage rate of the virtual machine monitor (VMM) running on the server 3 and the CPU usage rate of all the virtual machines 33 (VM1 (30%), VM2 (40%)).

Next, the structure of the resource usage state data 311 will now be described. The resource usage state data 311 is not necessarily limited to the CPU usage rate. For example, the resource usage state data 311 may include the amount of memory transfer per time unit, the amount of disk transfer per time unit (amount of I/O transfer) and the amount of network traffic per time unit. Further, several types of resource usage state data 311 may be used at the same time.

Figure 3:
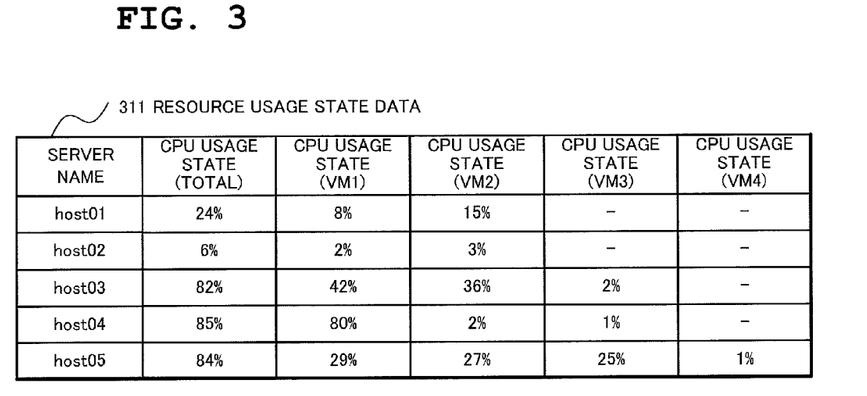
FIG. 3 is a diagram illustrating an example of the structure of resource usage state data 311 stored in a resource usage state storage unit 14 according to the first exemplary embodiment.

FIG. 3 is a diagram illustrating an example of the structure of the resource usage state data 311 stored in the resource usage state storage unit 14.

Referring to FIG. 3, the resource usage state storage unit 14 according to the present exemplary embodiment stores the resource usage state data 311 regarding the five servers 3 from host01 to host05, in this example. Commonly to all the servers 3, these resource usage state data 311 include the measurement values regarding the total CPU usage rate. Further, the resource usage state data 311 according to the present exemplary embodiment includes the CPU usage rate of each of the virtual machines 33 running on each server 3.

Note that the number of the virtual machines 33 run by the server 3 may be different, thus the number of data (the number of CPU usage rates from VM1 to VMn) related to the CPU usage rate of the virtual machines 33 may be different for each server 3. In FIG. 3, the number of data related to the CPU usage rate of the virtual machines 33 is two (VM1 and VM2) for each of host01 and host02, three (VM1, VM2 and VM3) for each of host03 and host04, and four (VM1, VM2, VM3 and VM4) for host05.

Note that if the resource usage state data 311 to be collected by the resource usage state acquisition unit 31 is other than the CPU usage rate, the structure of the resource usage state data 311 stored in the resource usage state storage unit 14 is changed accordingly.

Figure 4:
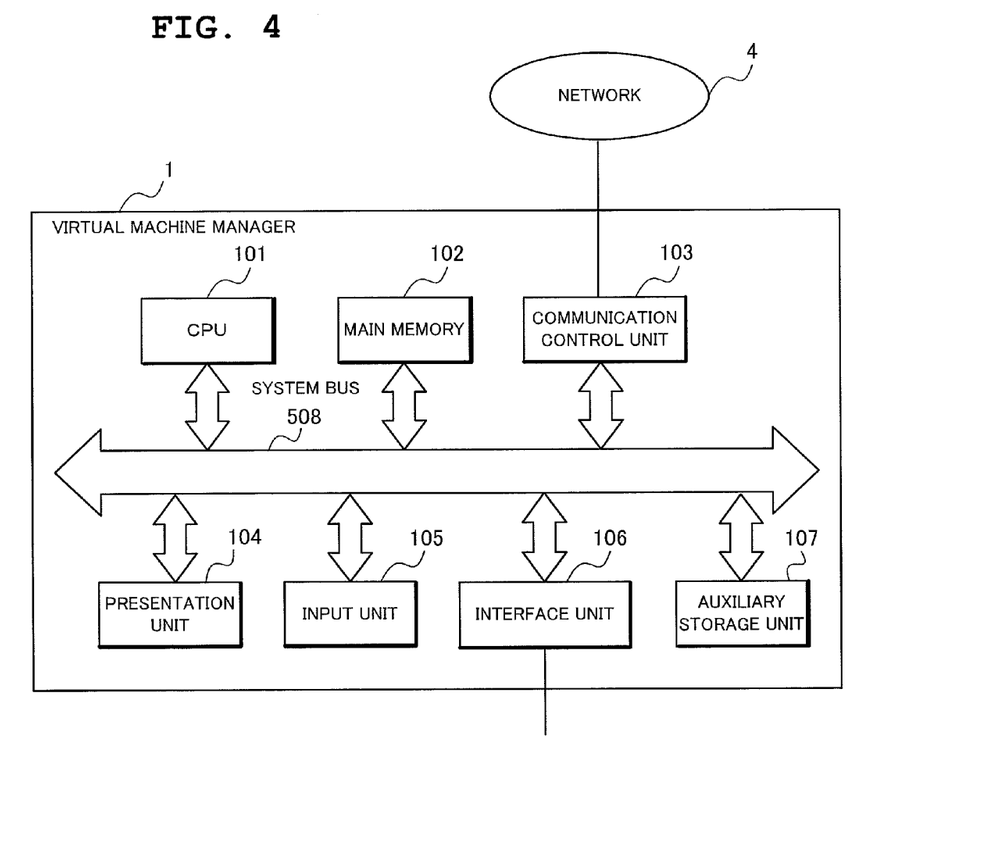
FIG. 4 is a block diagram illustrating an example of the hardware structure of a virtual machine manager 1 of the virtual machine location system according to the first exemplary embodiment.

The hardware structure of the virtual machine manager 1 will now be described.

FIG. 4 is a block diagram illustrating an example of the hardware structure of the virtual machine manager 1 of the virtual machine location system according to the present exemplary embodiment.

Referring to FIG. 4, the virtual machine manager 1 according to the present invention may be achieved with the similar hardware structure to that of a general computer, and comprises a central processing unit (CPU) 101, a main storage unit 102, which is a main memory such as a random access memory (RAM), and used as a work area for data and a temporary save area for data, a communication control unit 103 for sending/receiving the data through the network 4, a presentation unit 104 such as a liquid crystal display, a printer and a speaker, an input/output unit 105 such as a keyboard and a mouse, an interface unit 106, which is connected to peripheral devices to send/receive data, an auxiliary storage unit 107, which is a hard disk device formed of a nonvolatile memory such as a read only memory (ROM), a magnetic disk and a semiconductor memory, and a system bus 108 for interconnecting each of the above described components of the information processing unit.

The virtual machine manager 1 according to the present invention can achieve its operation obviously in hardware by implementing in the virtual machine manager 1 a circuit component comprising a hardware component such as a large scale integration (LSI) in which a program for achieving such a function is incorporated, as well as in software by executing a program for providing each function of each component described above with the CPU 101 on the computer processing device.

Namely, the CPU 101 loads into the main storage unit 102 and executes the program stored in the auxiliary storage unit 107, and controls the operation of the virtual machine manager 1 to achieve each function described above in software.

Note that the server 3 according to the present exemplary embodiment or each of other exemplary embodiments described later may have a structure as described above to achieve each function described above in hardware or in software.

Operation of the First Exemplary Embodiment

The operation of the virtual machine location system according to the present exemplary embodiment will now be described in detail.
(Operating Procedure of Resource Usage State Collection Unit 11)

Figure 5:
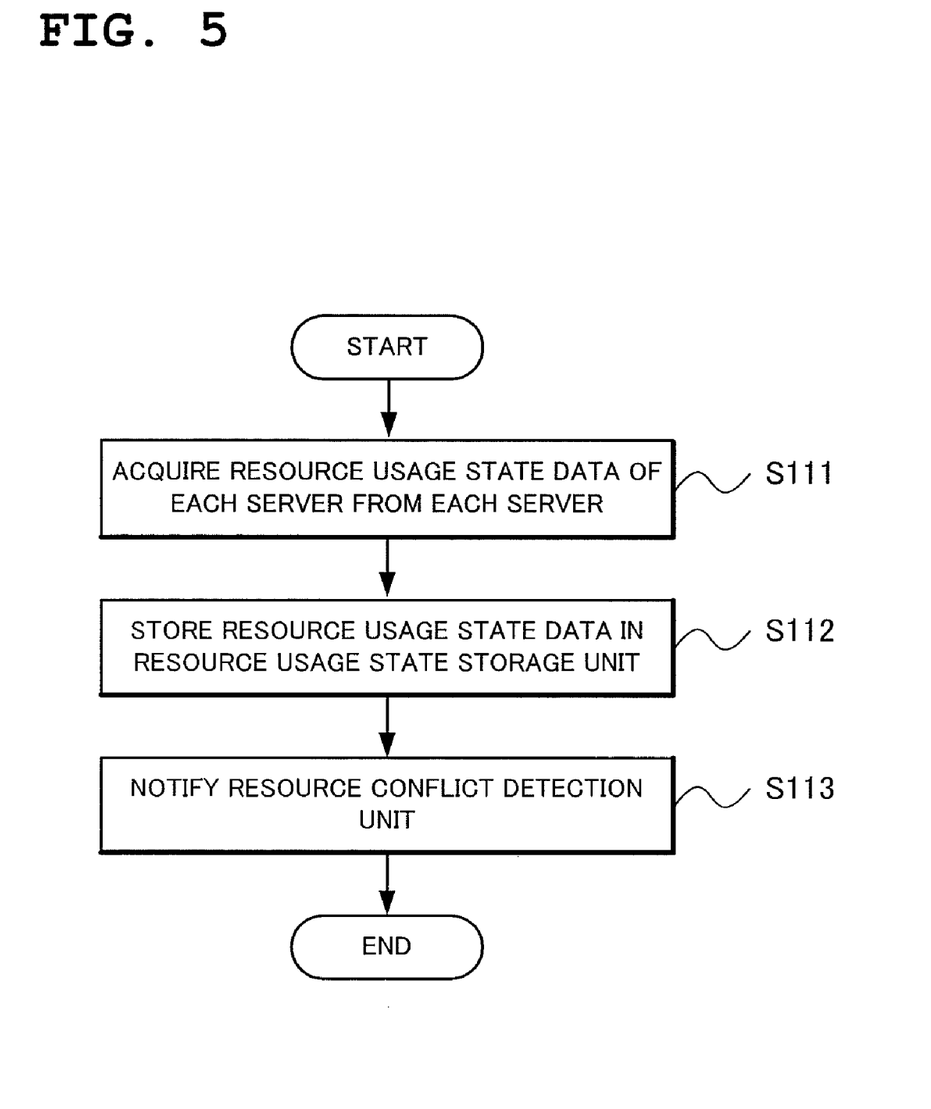
FIG. 5 is a flowchart illustrating the operating procedure of a resource usage state collection unit 11 according to the first exemplary embodiment.

The resource usage state collection unit 11 repeatedly performs the operations of acquiring the resource usage state data 311 from a server 3 under management at preset regular intervals, and storing the acquired resource usage state data 311 in the resource usage state storage unit 14.

The operating procedure of the resource usage state collection unit 11 will be described below in connection with the flowchart of FIG. 5.

First, the resource usage state collection unit 11 acquires, from a plurality of servers 3 connected through the network 4, the resource usage state data 311 regarding the servers 3 (Step S111).

Next, the resource usage state collection unit 11 stores the resource usage state data 311 acquired in the previous step in the resource usage state storage unit 14 (Step S112).

Finally, the resource usage state collection unit 11 notifies the resource conflict detection unit 12 of the arrival of the latest resource usage state data 311 (Step S113). Note that, upon reception of this notification, the resource conflict detection unit 12 starts operating.
(Acquisition of Resource Usage State Data 311)

The resource usage state data 311 acquired from the servers 3 by the resource usage state collection unit 11 is acquired by the resource usage state acquisition unit 31 on the server 3 under management. The resource usage state acquisition unit 31 is a program running on any of a host OS, a virtual machine monitor, or a privileged virtual machine (special virtual machine for controlling other virtual machines 33), and acquires the resource usage state data 311 through a command or an application programming interface (API) provided by existing OSs or virtual machine products (e.g., a vmstat command for UNIX (Registered Trademark)-type OS, and an xenmon command for Xen).

(Operating Procedure of Resource Conflict Detection Unit 12)

Figure 6:
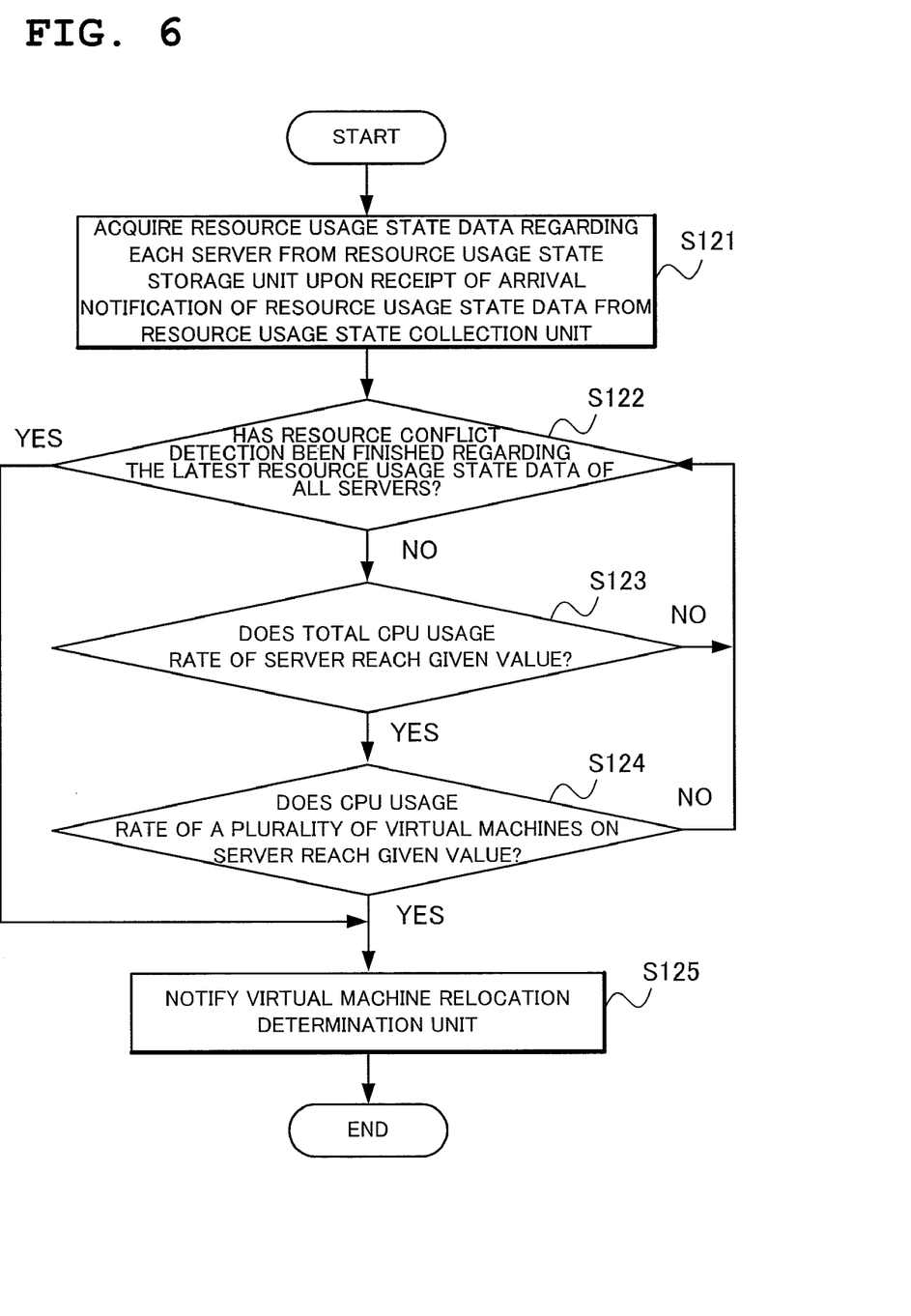
FIG. 6 is a flowchart illustrating the operating procedure of a resource conflict detection unit 12 according to the first exemplary embodiment.

Next, the operation of the resource conflict detection unit 12 will be described in detail. Upon receipt of the notification of the arrival of the resource usage state data 311 from the resource usage state collection unit 11, the resource conflict detection unit 12 sequentially takes out the resource usage state data 311 stored in the resource usage state storage unit 14, and checks whether or not there is a resource conflict on the server 3 under management. If a resource conflict has been detected, the resource conflict detection unit 12 notifies the virtual machine relocation determination unit 13 of occurrence of a resource conflict, and starts virtual machine relocation processing for resolving the conflict.

The operating procedure of the resource conflict detection unit 12 will be described below in connection with the flowchart of FIG. 6.

First, upon receipt of the notification of the arrival of the resource usage state data 311 from the resource usage state collection unit 11, the resource conflict detection unit 12 acquires the resource usage state data 311 regarding a single server 3 from the resource usage state storage unit 14 (Step S121).

At that time, if processing of Steps S123 to S125 has already been performed on the latest resource usage state data 311 of all the servers 3 stored in the resource usage state storage unit 14 (resource conflict detection has already been performed on the latest resource usage state data 311 of all the servers 3), the processing of the resource conflict detection unit 12 is ended (Step S122). Otherwise, this process goes to Step S123.

In Step S123, the resource conflict detection unit 12 checks if the total CPU usage rate has reached a predetermined value specified in advance, regarding the acquired resource usage state data 311. If so, the process goes to Step S124. Otherwise, the process returns to Step S121, where the resource usage state data 311 regarding the next single server 3 is checked. A threshold (a predetermined value specified in advance) used here is specified by a system administrator, for example, and the same value (e.g., 80%) may be specified for all the servers 3, or a different value may be specified for each server 3.

In Step S124, the resource conflict detection unit 12 checks if the CPU usage rates of two or more virtual machines have reached a predetermined value specified in advance, regarding the acquired resource usage state data 311. If so, the process goes to Step S125. Otherwise, the process returns to Step S121, where the resource usage state data 311 regarding the next single server 3 is checked. The ways of determining a threshold (a predetermined value specified in advance) here will be described later.

Finally, in Step S125, the resource conflict detection unit 12 notifies the virtual machine relocation determination unit 13 of start of the virtual machine relocation processing. The notification includes the contents of the resource usage state data 311 acquired in Step S121. Note that, after this step, the virtual machine relocation determination unit 13 starts operating.

(Way of Determining Threshold Regarding CPU Usage Rates of Virtual Machines 33 (1))

An example of the way of determining a threshold regarding the CPU usage rates of the virtual machines 33 used in Step S124 specifies the same threshold for all the virtual machines 33.

For example, when the same threshold is specified as 20%, if each of the CPU usage rates of two or more of the virtual machines 33 running on a single server 3 is equal to or higher than 20%, the resource conflict detection unit 12 determines that there is a resource conflict on the server, and the process goes to Step S125.

(Way of Determining Threshold Regarding CPU Usage Rates of Virtual Machines 33 (2))

Another example of the way of determining a threshold regarding the CPU usage rates of the virtual machines 33 determines the threshold dynamically based on the number of virtual machines 33 running on a single server 3, and the value of the total CPU usage rate.

Namely, assuming that the total CPU usage rate of a server 3 of interest is "Up", and the number of virtual machines running on the server 3 is "N", Up/N is used as the threshold.

A specific example of the way of determining the threshold will be provided in connection with the resource usage state data 311 shown in FIG. 3.

Since the total CPU usage rate of the server host01 is 24%, and two virtual machines are running on the server, the threshold is 24%/2=12%.

In the resource usage state data 311 of FIG. 3, one virtual machine (VM1) of two virtual machines on server host 01 is less than the threshold, therefore, the resource conflict detection unit 12 determines that there is no resource conflict on the host01.

Since the total CPU usage rate of the server host05 is 84%, and four virtual machines are running on the server, the threshold is 84%/4=21%.

In the resource usage state data 311 of FIG. 3, three virtual machines on the server host05 are equal to or higher than the threshold, therefore, the resource conflict detection unit 12 determines that there is a resource conflict on the three virtual machines (VM1, VM2 and VM3) on the host05.

Further, as a variation of this way of determining a threshold, instead of the threshold being set to Up/N, Up/N−k may be used as a threshold using a constant "k" specified in advance. In this case, the condition for detecting that a conflict occurred is looser compared to the case in which Up/N is used as the threshold. For example, regarding the server host05 of FIG. 3, the threshold for conflict occurrence detection, when k=5%, is 84%/4−5%=16%.

(Use of Resource Usage State Data 311 Other than CPU Usage Rate)

In above described Steps S123 and S124, the resource usage state data (measurement data) 311 used as a decision criterion for detecting a resource conflict is not limited to CPU usage rates, and the amount of memory transfer per time unit, the amount of disk transfer per time unit or the amount of network traffic per time unit may be used. In a conflict detection method using these measurement data, the CPU usage rate is replaced with these measurement data.

Note that, when detecting a resource conflict using, without limited to the CPU usage rate, measurement data related to two different types of data (by resource type), among data such as the amount of memory transfer, the amount of disk transfer or the amount of network traffic per time unit, the conflict detection method needs to be replaced with either of the following two types of detection methods:

(1) The above described Steps S121 to S124 are performed on each resource type used as a decision criterion, and when the occurrence of a conflict is detected regarding any of resource types, the process goes to Step S125.

(2) The procedure of the above described Steps S121 to S125 is performed as-is. However, only when the measurement values regarding all the resource types which are the decision criteria are equal to or higher than a given value in Step S123, the process goes to Step S124. Further, in S124, when the decision criteria are fulfilled for all the resource types serving as decision criteria, the process goes to Step S125.

(Operating Procedure of Virtual Machine Relocation Determination Unit 13).

Figure 7:
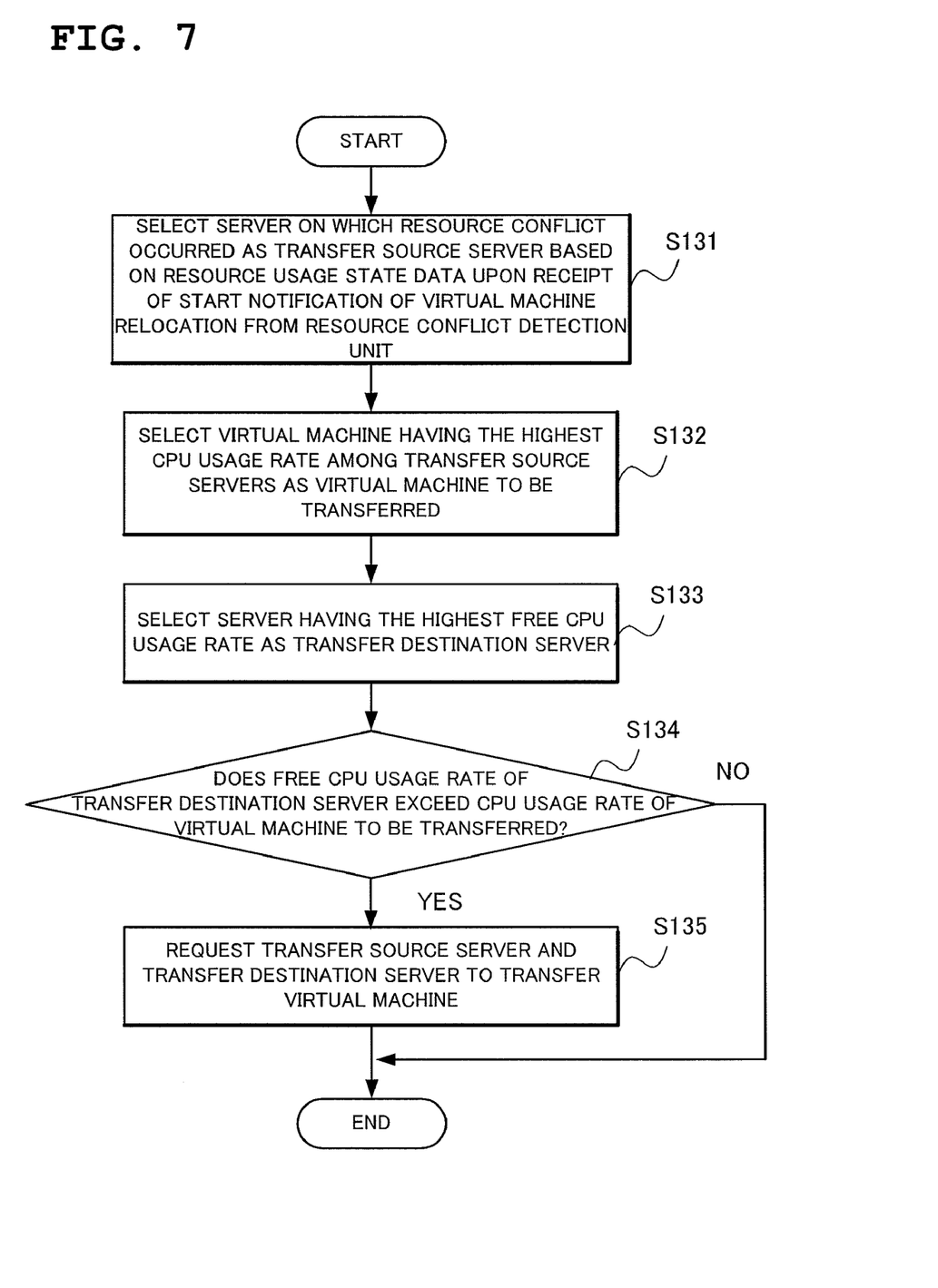
FIG. 7 is a flowchart illustrating the operating procedure of a virtual machine relocation determination unit 13 according to the first exemplary embodiment.

Next, the operating procedure of the virtual machine relocation determination unit 13 will be described. If a resource conflict is detected by the resource conflict detection unit 12, the virtual machine relocation determination unit 13 determines the following three pieces of information, and controls the relocation of a virtual machine 33 based on the information.

(1) A virtual machine 33 to be transferred is determined. A virtual machine 33 to be transferred means a virtual machine 33 transferred from a server 3 to which the virtual machine 33 itself belongs to another server 3 during the relocation of the virtual machine.

(2) A transfer source server is determined. A transfer source server means a server 3 to which a virtual machine 33 to be transferred belongs before the transfer of the virtual machine.

(3) A transfer destination server is determined. A transfer destination server means a server 3 to which a virtual machine 33 to be transferred belongs after the transfer of the virtual machine.

The operating procedure of the virtual machine relocation determination unit 13 will be described below in connection with the flowchart of FIG. 7.

First, upon receipt of the notification of the start of the virtual machine relocation processing from the resource conflict detection unit 12, the virtual machine relocation determination unit 13 selects as a transfer source server, the server 3 on which a resource conflict occurred (Step S131). The virtual machine relocation determination unit 13 can acquire the name of the server 3 on which a resource conflict occurred from the resource usage state data 311 contained in the notification issued in Step S125.

Next, the virtual machine relocation determination unit 13 selects as a virtual machine 33 to be transferred, the virtual machine having the highest CPU usage rate among virtual machines 33 running on the transfer source server (Step S132). The CPU usage rate of each virtual machine 33 running on the transfer source server is contained in the resource usage state data 311 contained in the notification issued in Step S125 described above.

Next, the virtual machine relocation determination unit 13 selects as a transfer destination server, the server having the largest free CPU usage rate among the servers 3 under management. A free CPU usage rate means a numeric value obtained from the following expression: free CPU usage rate=100%−total CPU usage rate.

Next, the virtual machine relocation determination unit 13 checks if the free CPU usage rate of the transfer destination server selected in Step S133 exceeds the CPU usage rate of the virtual machine 33 to be transferred selected in Step S132 (Step S134). If so, the process goes to Step S135, otherwise, the process is ended. In the latter case, the relocation of the virtual machine 33 is not performed.

Finally, in Step S135, the virtual machine relocation determination unit 13 requests either or both of the transfer source server 3 and the transfer destination server 3 to transfer the virtual machine 33 to be transferred. Upon receipt of the notification, the virtual machine control unit 32 on these servers 3 issues a command for transferring the existing virtual machine (e.g., xm migrate command for xen) to relocate the virtual machine 33.

(Way of Selecting Virtual Machine to be Transferred)

In Step S132 described above, the way that the virtual machine relocation determination unit 13 selects the virtual machine 33 to be transferred is not limited to one based on the CPU usage rate of the virtual machine 33.

One of other ways of selecting a virtual machine 33 to be transferred is based on resource usage state data (measurement data) 311 other than the CPU usage rate. For example, among virtual machines running on the transfer source server 3, the one having the highest I/O usage may be selected as measurement data. This case is based on the premise that the resource usage state collection unit 11 collects the data concerning the I/O usage of all the virtual machine 33 as the measurement data.

Another way of selecting a virtual machine 33 to be transferred is based on predetermined priorities specified in advance. For example, when the two virtual machines VM1 and VM2 are running on the transfer source server 3, and the priorities 2 and 1 are set on these virtual machines, respectively (where priority 2>1), the virtual machine relocation determination unit 13 selects the virtual machine VM1 having a higher priority as a transfer target.

Further, a virtual machine 33 to be transferred may be selected by combining measurement data regarding several types of resources such as a CPU, a memory, a disk or a network, and additionally combining priorities therewith. In this case, after an expression including these measurement data and priorities is specified, the virtual machine 33 having the highest calculated value obtained by the expression is selected as a virtual machine 33 to be transferred.

(Way of Selecting Transfer Destination Server)

In Step S133 described above, the way that the virtual machine relocation determination unit 13 selects the transfer destination server 3 is not limited to one based on the free CPU usage rate of the server 3.

One of other ways of selecting a transfer destination server 3 is based on resource usage state data (measurement data) 311 other than the CPU usage rate.

For example, the server 3 having the smallest I/O usage regarding the entirety of the single server 3 (hereinafter referred to as total I/O usage) may be selected as the transfer destination. This case is based on the premise that the resource usage state collection unit 11 collects the data regarding the total I/O usage of respective server 3. Further, as a criterion for selecting a transfer destination server 3, a certain expression may be used to combine measurement data regarding several types of resources such as a CPU, a memory, a disk or a network.

Note that if, among the servers 3 under management, one having a different hardware structure is included, it is not necessarily appropriate that the free CPU usage rates (or other measurement data) are simply compared to determine a transfer destination server 3. For example, a situation in which a server 3-1 has one CPU, another server 3-2 has the same type of two CPUs, and both servers have the free CPU usage rate of 80% is considered. In this case, since the server 3-2 can be assumed to have more space in the CPU resource, it is appropriate that the server 3-2 is selected. In order to address such a situation, a coefficient may be specified for each server, and the coefficient is multiplied to the free CPU usage rate (or other measurement data), which may be used as a selection criterion.

Another way of selecting a transfer destination server may determine priorities based on the conditions of respective servers 3. More specifically, the server 3 on which no virtual machine 33 is running may be selected as the transfer destination with a lower priority than the other servers 3 (namely, the server 3 on which no virtual machine 33 is running is selected only when, among the servers 3 on which a virtual machine 33 is running, there is not even one server having sufficient free resources). According to this method, by causing the virtual machines 33 to run on as few as possible number of servers 3 and turning off the power sources of the remaining servers 3, the electricity consumption by the servers 3 can be saved. This type of prioritization can be used in combination with other ways of selection described above.

Effects of the First Exemplary Embodiment

According to the present exemplary embodiment, the following effects can be achieved.

A first effect is that a virtual machine 33 can be relocated immediately in response to a sudden change in load.

The reason is that the virtual machine manager 1 relocates the virtual machine 33 based on the latest resource usage state data 311 of the virtual machine 33 without the past data regarding the performance of the virtual machine 33 when the relocation of the virtual machine 33.

A second effect is that a virtual machine 33 can be relocated without stopping a system running on the virtual machine 33.

The reason is that only the virtual machine 33 that has caused the resource conflict is the target of a relocation at one time, thus the operation of the other virtual machines 33 is not affected.

A third effect is that CPU performance required for a server 3 is lower than those of second and third exemplary embodiments, which are described later.

The reason is that most processing including the detection of a resource conflict and the determination of relocation of a virtual machine 33 is performed by the virtual machine manager 1 separated from the server 3. However, the virtual machine manager 1 needs a relatively high-performance hardware resource.

Second Exemplary Embodiment

Next, a virtual machine location system according to a second exemplary embodiment of the present invention will now be described in detail with reference to the drawings.

Structure of the Second Exemplary Embodiment

Figure 8:
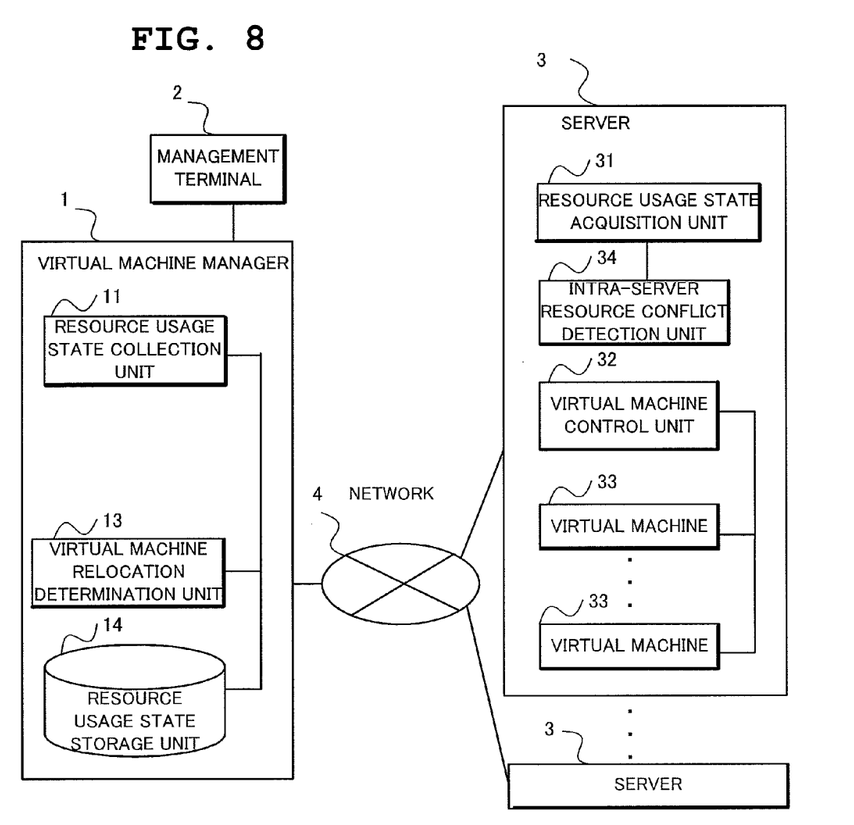
FIG. 8 is a block diagram illustrating the structure of a virtual machine location system according to a second exemplary embodiment of the present invention.

FIG. 8 is a block diagram illustrating the structure of a virtual machine location system according to the present exemplary embodiment.

Referring to FIG. 8, as in the first exemplary embodiment (FIG. 1), the virtual machine location system according to the present exemplary embodiment comprises a virtual machine manager 1, a management terminal 2 and a plurality of servers 3. The virtual machine manager 1 and the plurality of servers 3 are interconnected through the network 4.

The difference from the first exemplary embodiment is that the virtual machine manager 1 does not have the resource conflict detection unit 12, and the server 3 has an intra-server resource conflict detection unit 34.

Namely, in the present exemplary embodiment, instead of using the collected resource usage state data 311 for the virtual machine manager 1 to detect a resource conflict, the intra-server resource conflict detection unit 34 provided on each server 3 detects a resource conflict.

The intra-server resource conflict detection unit 34 has a function for detecting a resource conflict, which is similar to that of the resource conflict detection unit 12 according to the first exemplary embodiment, and a function for notifying the virtual machine relocation determination unit 13 provided on the virtual machine manager 1 that a conflict occurred through the server 3 when detecting a resource conflict on the server 3 on which the intra-server resource conflict detection unit 34 itself is provided. Further, the intra-server resource conflict detection unit 34 may have a function for storing the resource usage state data 311, which is similar to that of the resource usage state storage unit 14 according to the first exemplary embodiment. Note that the intra-server resource conflict detection unit 34 may make a notification including the contents of the resource usage state data 311 acquired from the resource usage state acquisition unit 31.

The virtual machine relocation determination unit 13 has a function for initiating virtual machine relocation determination processing at the time of receiving the notification.

Operation of the Second Exemplary Embodiment

Next, the operation of the virtual machine location system according to the present exemplary embodiment will be described in detail, focusing on the difference from the first exemplary embodiment.

(Operating Procedure of Resource Usage State Collection Unit 11)

Figure 9:
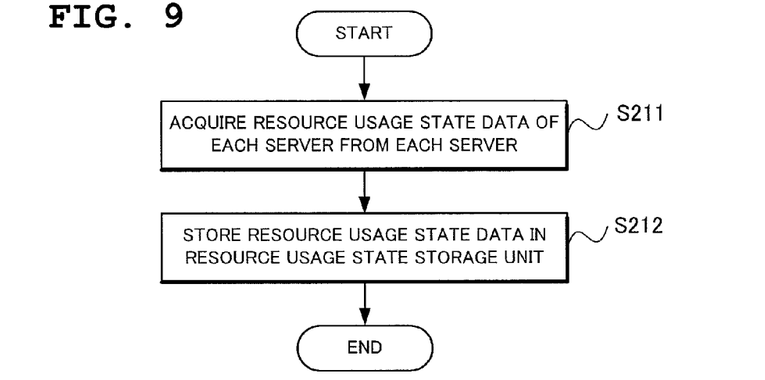
FIG. 9 is a flowchart illustrating the operating procedure of a resource usage state collection unit 11 according to the second exemplary embodiment.

FIG. 9 illustrates the operating procedure of the resource usage state collection unit 11 according to the second exemplary embodiment.

Steps S211 and S212 are the same as Steps S111 and S112 of FIG. 5 illustrating the operating procedure of the resource usage state collection unit 11 according to the first exemplary embodiment. The difference is that Step S113 is eliminated. Namely, the difference is that this processing is ended at the time when the resource usage state data 311 collected by the resource usage state collection unit 11 according to the present exemplary embodiment is stored in the resource usage state storage unit 14.

In principle, as in the first exemplary embodiment, the resource usage state collection unit 11 is executed at regular intervals. Alternatively, the resource usage state collection unit 11 may be executed at the time when the virtual machine relocation determination unit 13 receives the notification indicating that a resource conflict occurred from the intra-server resource conflict detection unit 34. In the former case, the virtual machine relocation determination unit 13 can initiate virtual machine relocation processing as soon as a resource conflict is detected. On the other hand, in the latter case, although time is needed for collecting the resource usage state data 311 when a resource conflict occurred, consumption of the CPU and the network bandwidth generated due to collecting the resource usage state data 311 during a normal situation (namely, when no resource conflict occurs) can be held in check.

(Operating Procedure of Virtual Machine Relocation Determination Unit 13).

The operation of the virtual machine relocation determination unit 13 according to the present exemplary embodiment is basically similar to that of the virtual machine relocation determination unit 13 according to the first exemplary embodiment (FIG. 7). Note that there is a difference in that, according to the second exemplary embodiment, the virtual machine relocation determination unit 13 starts operating upon receipt of a notification from the intra-server resource conflict determination unit 34, compared to the first exemplary embodiment in which the virtual machine relocation determination unit 13 starts operating upon receipt of a notification from the resource conflict detection unit 12.

Further, if the resource usage state collection unit 11 is not executed at regular intervals (namely, if the processing of the resource usage state collection unit 11 is started at the time when the virtual machine relocation determination unit 13 receives the notification indicating that a resource conflict occurred), the processing of the resource usage state collection unit 11 (Steps S211 and S212 of FIG. 9) has to be finished before Step S131 of FIG. 7.

(Operating Procedure of Intra-Server Resource Conflict Detection Unit 34)

The operating procedure of the intra-server resource conflict detection unit 34 will be described in connection with the flowchart of FIG. 10. The basic flow of the operation is the same as that of the resource conflict detection unit 12 according to the first exemplary embodiment (FIG. 6). Note that the difference is that the intra-server resource conflict detection unit 34 does not sequentially acquire all data stored in the resource usage state storage unit 14, but handles only the resource usage state data 311 regarding a single server 3. According to the present exemplary embodiment, the intra-server resource conflict detection unit 34 is executed at regular intervals specified in advance.

First, the intra-server resource conflict detection unit 34 acquires the latest resource usage state data 311 from the resource usage state acquisition unit 31 in a server 3 (Step S221). The resource usage state data 311 acquired at that time is limited to data regarding a single server 3. For example, the resource usage state collection unit 31 in a server 3-1 acquires only the resource usage state data 311 regarding the same server 3-1.

Next, the intra-server resource conflict detection unit 34 checks if the total CPU usage rate has reached a predetermined value specified in advance, regarding the acquired resource usage state data 311 (Step S222). If so, the process goes to Step S223. Otherwise, the processing of the intra-server resource conflict detection unit 34 is ended, and, after idling for a given period of time, the processing from Step S221 onward is performed again. The processing in this step is the same as that of Step S123 in the resource conflict detection unit 12.

In Step S223, the intra-server resource conflict detection unit 34 checks if the CPU usage rates of two or more virtual machines 33 have reached a predetermined value specified in advance, regarding the acquired resource usage state data 311. If so, the process goes to Step S224. Otherwise, the processing of the intra-server resource conflict detection unit 34 is ended, and, after idling for a given period of time, the processing from Step S221 onward is performed again. The processing in this step is the same as that of Step S124 in the resource conflict detection unit 12.

Finally, in Step S224, the intra-server resource conflict detection unit 34 notifies the virtual machine relocation determination unit 13 in the virtual machine manager 1 of start of the virtual machine relocation processing. The notification includes the contents of the resource usage state data 311 acquired in Step S221. After this step, the processing of the virtual machine relocation determination unit 13 starts.

Effects of the Second Exemplary Embodiment

According to the present exemplary embodiment, the following effects can be achieved.

A first effect is that the time required between the occurrence of a conflict and the detection thereof is short because the intra-server resource conflict detection unit 34 is located on each server 3.

A second effect is that the performance required for the virtual machine manager 1 is lower than that of the first exemplary embodiment because resource conflict detection is not performed in the virtual machine manager 1. However, the server 3 needs the performance higher than that of the first exemplary embodiment.

Third Exemplary Embodiment

A virtual machine location system according to a third exemplary embodiment of the present invention will now be described in detail with reference to the drawings.

Structure of the Third Exemplary Embodiment

Figure 11:
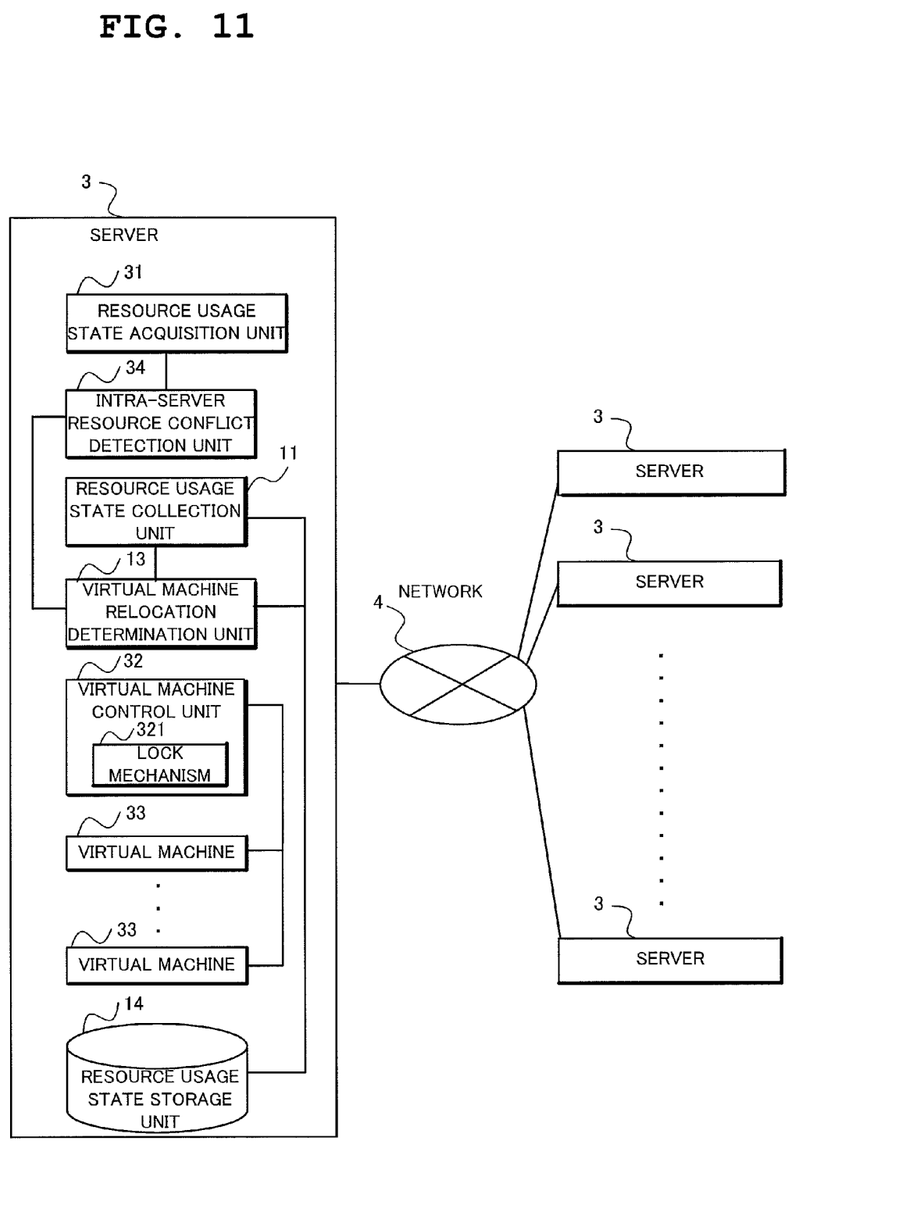
FIG. 11 is a block diagram illustrating the structure of a virtual machine location system according to a third exemplary embodiment of the present invention.

FIG. 11 is a block diagram illustrating the structure of the virtual machine location system according to the present exemplary embodiment.

Referring to FIG. 11, the virtual machine location system according to the present exemplary embodiment has a plurality of servers 3, which are interconnected by the network 4.

Differing from the first and second exemplary embodiments, the virtual machine location system according to the present exemplary embodiment has no virtual machine manager 1. Instead, in the virtual machine location system according to the present exemplary embodiment, each server 3 has a function of the virtual machine manager 1 according to the first and second exemplary embodiments. Namely, each server 3 according to the present exemplary embodiment includes the resource usage state collection unit 11, a virtual machine (VM) relocation determination unit 13 and a resource usage state storage unit (DB) 14.

In addition, the virtual machine control unit 32 in each server 3 according to the present exemplary embodiment has a lock mechanism 321.

The lock mechanism 321 has a function, when the virtual machine relocation determination unit 13 in a server 3 determines the transfer of the virtual machine 33 to the server 3 having the lock mechanism 321 and has accessed the server 3, for causing the first virtual machine relocation determination unit 13 to have accessed the server to acquire exclusively the access right (lock). Therefore, when the virtual machine relocation determination unit 13 in a server 3 has already acquired the lock on a predetermined server 3, access to the server 3 from the virtual machine relocation determination unit 13 in another server 3 is not permitted.

As in the second exemplary embodiment, the virtual machine location system according to the present exemplary embodiment uses the intra-server conflict detection unit 34 provided on each server 3 to detect a resource conflict on each server 3. When the intra-server conflict detection unit 34 is used to detect a resource conflict, the server relocation determination unit 13 provided on the server 3 on which the resource conflict occurred, is used to relocate the virtual machine 33.

Operation of the Third Exemplary Embodiment

Next, the operation of the virtual machine location system according to the present exemplary embodiment will be described in detail, focusing on the difference from the first and second exemplary embodiments.

(Operating Procedure of Intra-Server Resource Conflict Detection Unit 34)

Figure 10:
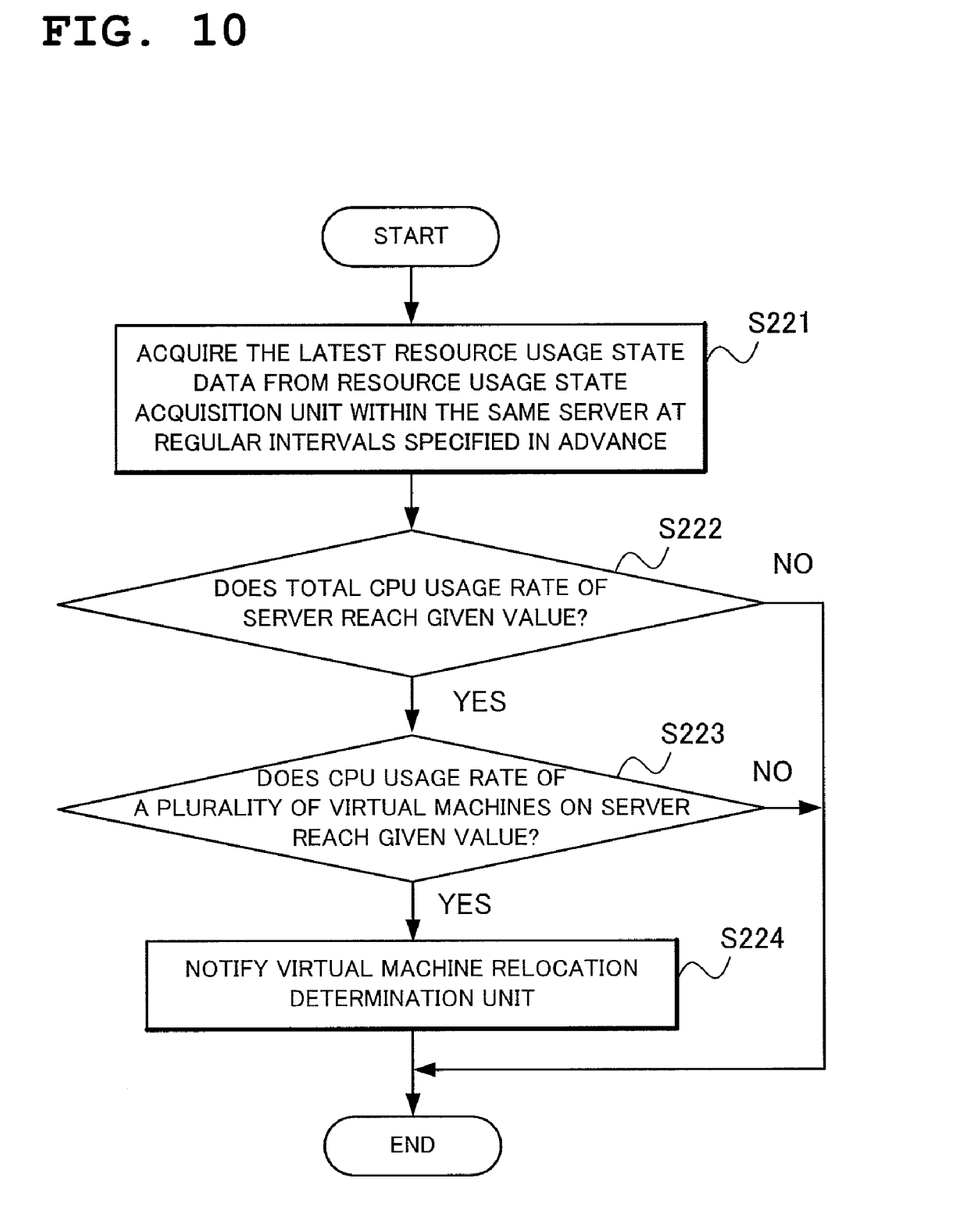
FIG. 10 is a flowchart illustrating the operating procedure of an intra-server resource conflict detection unit 34 according to the second exemplary embodiment.

The operating procedure of the intra-server resource conflict detection unit 34 according to the present exemplary embodiment is the same as that of the intra-server resource conflict detection unit 34 according to the second exemplary embodiment (FIG. 10). Note that there is a difference in that, in Step S224, the intra-server resource conflict detection unit 34 according to the present exemplary embodiment does not notify the virtual machine manager 1 of start of the virtual machine relocation, but notifies the virtual machine relocation determination unit 13 in the server 3 on which the intra-server resource conflict detection unit 34 itself is provided. Namely, the intra-server resource conflict detection unit 34 according to the present exemplary embodiment notifies the virtual machine relocation determination unit 13 in a server 3-1 of the start of the virtual machine relocation when the intra-server resource conflict detection unit 34 in the same server 3-1 detects a resource conflict.

(Operating Procedure of Resource Usage State Collection Unit 11)

The operating procedure of the resource usage state collection unit 11 according to the present exemplary embodiment is the same as that of the resource usage state collection unit 11 according to the second exemplary embodiment (FIG. 9). Note that, according to the present exemplary embodiment, the resource usage state collection unit 11 is executed every time the execution of the virtual machine relocation determination unit 13 (which will be described later) is started, not at regular intervals.

(Operating Procedure of Virtual Machine Relocation Determination Unit 13)

The operation of the virtual machine relocation determination unit 13 according to the present exemplary embodiment is basically similar to that of the virtual machine relocation determination unit 13 according to the first exemplary embodiment (FIG. 7). However, there are two differences as follows:

(1) In Step S131, the virtual machine relocation determination unit 13 according to the present exemplary embodiment starts operating upon receipt of the notification from a server 3 on which the virtual machine relocation determination unit 13 itself is provided or the intra-server resource conflict detection unit 34 in another server 3, not from the resource conflict detection unit 12.

(2) The virtual machine relocation determination unit 13 according to the present exemplary embodiment finishes the processing of the resource usage state collection unit 11 (Steps S211 and S212 of FIG. 9) before Step S131 is performed. At that time, in Step S211, the virtual machine relocation determination unit 13 according to the present exemplary embodiment acquires the resource usage state data from a server 3 on which the virtual machine relocation determination unit 13 itself is provided, not from each server 3.

According to the present exemplary embodiment, since each server 3 has the virtual machine relocation determination unit 13, the virtual machine relocation determination units 13 of two or more servers 3 may operate simultaneously, thus there is the possibility that transfers of virtual machines 33 are attempted simultaneously with respect to a single server 3.

In order to avoid this situation, the virtual machine control unit 32 in a server 3 has the above described lock mechanism 321.

When the virtual machine relocation determination unit 13 selects a server 3 as a transfer destination server in Step S133, the virtual machine relocation determination unit 13 has to acquire the lock on the server 3. If the virtual machine relocation determination unit 13 could not acquire the lock, namely, if the virtual machine relocation determination unit 13 in another server 3 has already acquired the lock, a different server 3 is selected as a transfer destination server.

Figure 12:
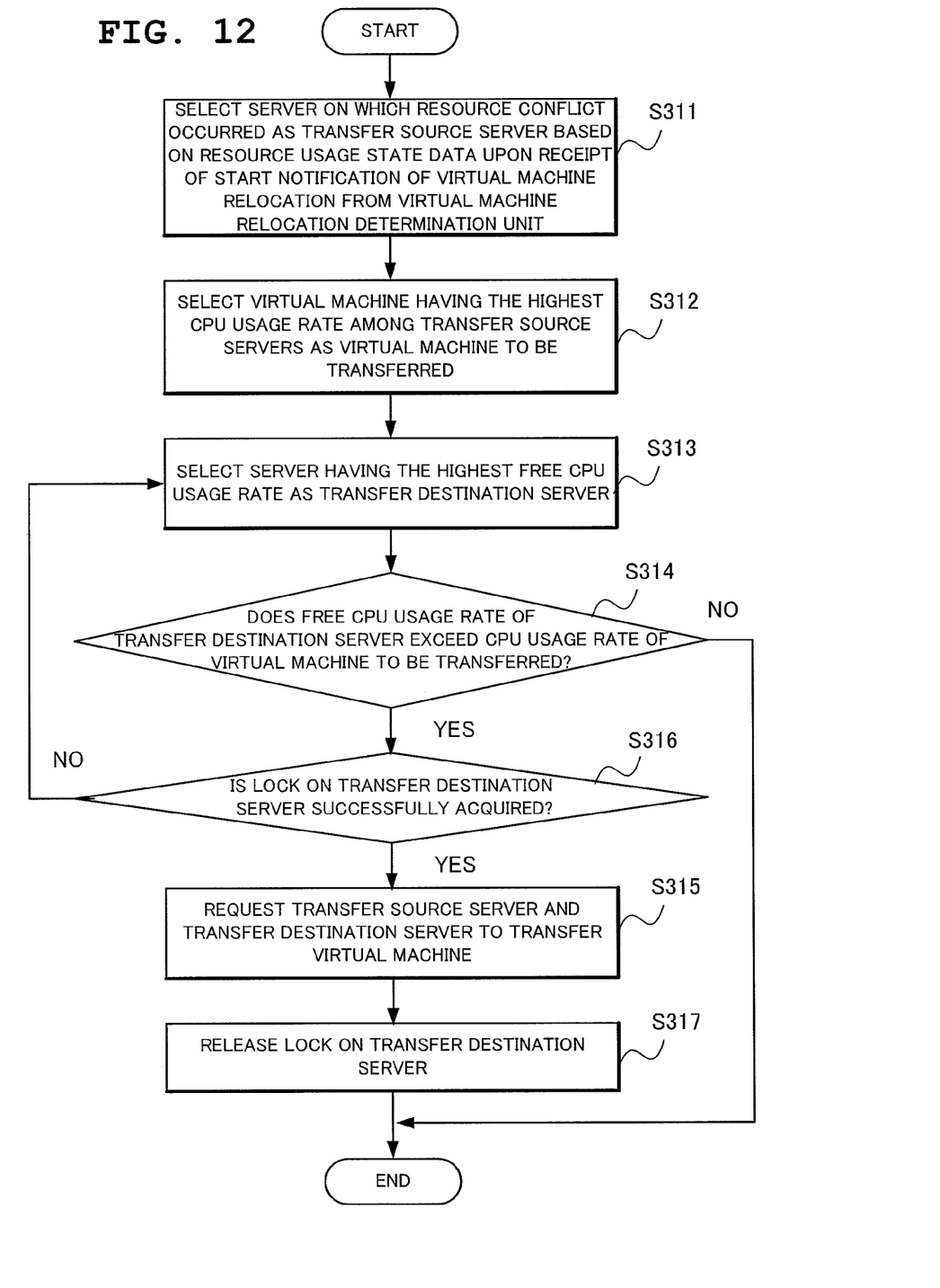
FIG. 12 is a flowchart illustrating the operating procedure of a virtual machine relocation determination unit 13 according to the third exemplary embodiment.

The operating procedure of the virtual machine relocation determination unit 13 according to the present exemplary embodiment utilizing the lock mechanism 35 will be described below in connection with the flowchart of FIG. 12.

Steps S311 to S314 and Step S315 are the same as those of a case in which a lock mechanism is not utilized (Steps S131 to S134 and Step S135 of FIG. 7). In Step S314, the virtual machine relocation determination unit 13 according to the present exemplary embodiment goes to Step S316, not to Step S315, if the free CPU usage rate of a transfer destination server exceeds the CPU usage rate of a virtual machine to be transferred.

In Step S316, the virtual machine relocation determination unit 13 according to the present exemplary embodiment tries to acquire the lock on a transfer destination server. If the lock can be acquired successfully in Step S316, the process goes to Step S235. If the lock cannot be acquired in Step S316, the process returns to Step S313, where the virtual machine relocation determination unit 13 selects a transfer destination server again. In this case, the virtual machine relocation determination unit 13 excludes from the target to be selected as transfer destination servers the servers that failed in lock acquisition until the previous time.

After the transfer of the virtual machine is finished in Step S315, the process goes to Step S317. In Step S237, the virtual machine relocation determination unit 13 releases the lock acquired in Step S316.

Effects of the Third Exemplary Embodiment

An effect of the third exemplary embodiment is that a dedicated virtual machine manager (or a server into which a program serving as a virtual machine manager is integrated) does not have to be provided. According to the first and second exemplary embodiments, the virtual machine manager 1 is needed for the relocation of the virtual machine 33, therefore, in the event of failure of the virtual machine manager 1, the present invention does not function. On the other hand, according to the third exemplary embodiment, even in the event of failure of any servers 3, the relocation of the virtual machine 33 can be performed.

According to the present exemplary embodiment described above, the following effects can be achieved.

A first effect is that a virtual machine can be relocated immediately in response to a sudden change in load.

The reason is that a resource conflict determination unit is provided for detecting a resource conflict using the resource usage state regarding the entirety of a single server, and the measurement result of the resource usage state of a virtual machine running on the server, therefore, the relocation of the virtual machine is performed only based on the latest information regarding the resource usage state of the virtual machine without the past data regarding the performance of the virtual machine.

A second effect is that a virtual machine can be relocated without stopping a system running on the virtual machine.

The reason is that the virtual machine relocation determination unit is provided for transferring the virtual machine on a server for which a resource conflict has been detected to another server having a lower resource usage rate, therefore, only the virtual machine that has caused the resource conflict is the target of a relocation at one time, thus the operation of other virtual machines is not affected.

Although the preferred exemplary embodiments of the present invention have been described, the present invention is not necessarily limited thereto, and various modifications may be made without departing from the technical idea.

INCORPORATION BY REFERENCE

The present application claims the benefit of the priority of Japanese Patent Application No. 2006-317175, filed on Nov. 24, 2006, and the disclosure is incorporated herein.

INDUSTRIAL APPLICABILITY

The present invention can be applied to operation management middleware for centrally managing server resources forming an enterprise information system or a data center, or a self-managing server in the enterprise information system or the data center.

What is claimed is:

1. A virtual machine location system, comprising:
   a processor; and
   a memory;
   wherein said processor executes
   a resource conflict detection unit detecting a resource conflict using measurement data regarding a resource usage state of the entirety of a single server, and a resource usage state of a virtual machine running on said server; and
   a virtual machine relocation determination unit transferring said virtual machine on said server for which said resource conflict has been detected to another server having a lower resource usage rate,
   wherein said resource conflict detection unit determines there is a resource conflict when a resource usage rate regarding the entirety of said single server is equal to or higher than a given value specified in advance, and a resource usage rate of a plurality of virtual machines running on the server is equal to or higher than a given value specified separately.

2. The virtual machine location system according to claim 1, further comprising:
   a resource usage state collection unit collecting said measurement data from said server through a network.

3. The virtual machine location system according to claim 1, wherein
   said resource conflict detection unit
   uses, as the resource usage rate, any or a combination of a CPU usage rate, the amount of I/O transfer, and the amount of network transfer within a given period of time.

4. The virtual machine location system according to claim 1, wherein
   said virtual machine relocation determination unit
   selects as a transfer target, a virtual machine having the highest resource usage rate among the virtual machines running on said server on which a resource conflict has occurred, and
   selects as a transfer destination, a server having the lowest resource usage rate among all of said servers.

5. The virtual machine location system according to claim 4, wherein
   said virtual machine relocation determination unit
   uses, as the resource usage rate, any or a combination of a CPU usage rate, the amount of I/O transfer, and the amount of network transfer within a given period of time.

6. The virtual machine location system according to claim 1, wherein
   said virtual machine relocation determination unit
   acquires a lock on said server selected as a transfer destination, and
   releases said lock after the transfer of said virtual machine is finished.

7. A virtual machine location method for transferring a virtual machine from a server to another server, comprising:
   a resource conflict detection step of detecting a resource conflict using measurement data regarding a resource usage state of the entirety of a single server, and a resource usage state of a virtual machine running on said server; and
   a virtual machine relocation determination step of transferring said virtual machine on said server for which said resource conflict has been detected to another server having a lower resource usage rate,
   wherein said resource conflict detection step determines there is a resource conflict when a resource usage rate regarding the entirety of said single server is equal to or higher than a given value specified in advance, and a resource usage rate of a plurality of virtual machines running on said server is equal to or higher than a given value specified separately.

8. The virtual machine location method according to claim 7, further comprising
   a resource usage state collection step of collecting said measurement data from said server through a network.

9. The virtual machine location method according to claim 7, wherein
   at said resource conflict detection step,
   uses, as the resource usage rate, any or a combination of a CPU usage rate, the amount of I/O transfer, and the amount of network transfer within a given period of time.

10. The virtual machine location method according to claim 7, wherein
    at said virtual machine relocation determination step,
    when determining a transfer destination of said virtual machine,
    selects as a transfer target, a virtual machine having the highest resource usage rate among the virtual machines running on said server on which a resource conflict has occurred, and
    selects as a transfer destination, a server having the lowest resource usage rate among all of said servers.

11. The virtual machine location method according to claim 10, wherein
    at said virtual machine relocation determination step,
    when determining a transfer destination of said virtual machine,
    uses, as the resource usage rate, any or a combination of a CPU usage rate, the amount of I/O transfer, and the amount of network transfer within a given period of time.

12. The virtual machine location method according to claim 7, wherein
    at said virtual machine relocation determination step,
    when transferring said virtual machine,
    acquires a lock on said server selected as a transfer destination, and
    releases said lock after the transfer of said virtual machine is finished.

13. A non-transitory computer readable medium for storing a program for causing a virtual machine to transfer from a server to another server, said program making said server or a management terminal connected to said server through a network execute following functions:

a resource conflict detection function for detecting a resource conflict using measurement data regarding a resource usage state of the entirety of a single server, and a resource usage state of a virtual machine running on said server;

a transfer target selection function for selecting said virtual machine on said server for which said resource conflict has been detected as a transfer target; and a transfer destination selection function for selecting another server having a lower resource usage rate as a transfer destination of said virtual machine, wherein, in said resource conflict detection function, determining there is a resource conflict when a resource usage rate regarding the entirety of said single server is equal to or higher than a given value specified in advance, and a resource usage rate of a plurality of virtual machines running on said server is equal to or higher than a given value specified separately.

14. The non-transitory computer readable medium according to claim 13, wherein said program making said server or a management terminal connected to said server through said network execute a resource usage state collection function for collecting said measurement data from said server through said network.

15. The non-transitory computer readable medium according to claim 13, wherein in said resource conflict detection function, using, as the resource usage rate, any or a combination of a CPU usage rate, the amount of I/O transfer, and the amount of network transfer within a given period of time.

16. The non-transitory computer readable medium according to claim 13, wherein in said transfer target selection function selecting as a transfer target, a virtual machine having the highest resource usage rate among the virtual machines running on said server on which a resource conflict has occurred, and in said transfer destination selection function selecting as a transfer destination, a server having the lowest resource usage rate among all of said servers.

17. The non-transitory computer readable medium according to claim 16, wherein in said transfer target selection function and said transfer destination selection function using, as the resource usage rate, any or a combination of a CPU usage rate, the amount of I/O transfer, and the amount of network transfer within a given period of time.

18. The non-transitory computer readable medium according to claim 13, wherein in said transfer destination selection function acquiring a lock on said server selected as a transfer destination, and releasing said lock after the transfer of said virtual machine is finished.

* * * * *